United States Patent [19]

Matsumoto et al.

[11] Patent Number: 5,465,299
[45] Date of Patent: Nov. 7, 1995

[54] ELECTRONIC DOCUMENT PROCESSING SYSTEM AND METHOD OF FORMING DIGITAL SIGNATURE

[75] Inventors: Hiroshi Matsumoto, Fujisawa; Kazuo Takaragi, Ebina; Seiichi Susaki, Yokohama; Hiroyuki Maezawa, Tama; Shinobu Koizumi, Sagamihara, all of Japan

[73] Assignees: Hitachi, Ltd., Tokyo; Hitachi Chubu Software, Ltd., Aichi, both of Japan

[21] Appl. No.: 158,618

[22] Filed: Nov. 29, 1993

[30] Foreign Application Priority Data

Dec. 3, 1992 [JP] Japan .................... 4-350461

[51] Int. Cl.$^6$ .................................................. H04K 1/00
[52] U.S. Cl. .................... 380/23; 380/30; 380/49
[58] Field of Search .................... 380/30, 28, 23, 380/49, 4

[56] References Cited

U.S. PATENT DOCUMENTS 4,885,777  12/1989  Takaragi et al. .................... 380/30
5,018,195   5/1991  Takaragi et al. .................... 380/30

OTHER PUBLICATIONS

Tsujii, Shigeo, et al. "Cryptography and Information Security," published by Shokodo, pp. 127–147. (Provided in Japanese).

Primary Examiner—David C. Cain
Attorney, Agent, or Firm—Fay, Sharpe, Beall, Fagan, Minnich & McKee

[57] ABSTRACT

In a terminal which received an electronic document with at leastone digital signature, when a user changes the contents of the received electronic document, a new digital signature is produced by enciphering signature data by using a secret key of the user, the signature data including a hash total of the document of a new version, personal information of the user (signatory), and version management information necessary to restore an electronic document of a former version from the electronic document of the new version. The new digital signature and the new version electronic document version are transmitted together with the received digital signature to a next person on a document circulating route.

18 Claims, 14 Drawing Sheets

FIG. 7

412 VERSION MANAGEMENT TABLE

| | CODE (501) | ADDRESS (502) | SIZE (503) | DATA (504) |
|---|---|---|---|---|
| 505 | 2 | 279120 | 3200 | ujr8t3qhlivha ··· wef8yhaf8yl |
| 506 | 1 | 891236 | 458 | — |
| 507 | 3 | 114031 | — | khtp0u65poj ··· retu9iyw45oj |
| | ⋮ | ⋮ | ⋮ | ⋮ |

FIG. 11

900 VERSION MANAGEMENT TABLE

| | PERSONAL ID | CODE | ADDRESS | SIZE | DATA | DIGITAL SIGNATURE |
|---|---|---|---|---|---|---|
| 907~ | A | 0 | — | — | — | 1101···010 |
| 908~ | B | 2 | 279120 | 3200 | ujr8t3qhl···yhaf8yl | — |
| 909~ | B | 1 | 891236 | 458 | — | 1000···110 |
| 910~ | C | 0 | — | — | — | 0100···110 |
| 911~ | D | 3 | 114031 | — | khtp0u65···riyw45oj | 0111···010 |
| | ⋮ | ⋮ | ⋮ | ⋮ | ⋮ | ⋮ |

901, 902, 903, 904, 905, 906

ELECTRONIC DOCUMENT PROCESSING SYSTEM AND METHOD OF FORMING DIGITAL SIGNATURE

CROSS-REFERENCE TO RELATED APPLICATIONS

This application relates to K. Takaragi et al U.S. Pat. No. 4,885,777 entitled "ELECTRONIC TRANSACTION SYSTEM" and K. Takaragi et al U.S. Pat. No. 5,018,196 entitled "METHOD FOR ELECTRONIC TRANSACTION WITH DIGITAL SIGNATURE".

BACKGROUND OF THE INVENTION

1. Field of the Invention

The present invention relates to an electronic document processing system and, more particularly, to a technique for production and authentication of a digital signature which is added to electronic document data.

2. Description of the Related Art

For example, in the case where an electronic mail system is used and one document is sequentially circulated from a drafter to a plurality of persons concerned and an approval for the contents of the document is obtained from each person concerned, in order to make it possible to find out whether or not an illegal alteration has been executed in the correspondence relation between the approved document contents and the signature of the approver during the circulation or after the circulation, there has been known an application of "digital signature" which is obtained by enciphering digest data (hash total) derived by performing a hash total process to the document data and personal data of the approver.

As a technique for verifying validity of such a kind of electronic document data, for example, various kinds of techniques such as a technique disclosed in Japanese literature "Cryptography and Information Security", edited by Shigeo Tsujii and Masao Kasahara, published by Shokodo, pages 127 to 147 and the like have conventionally been proposed.

FIG. 14 shows an example of an authenticating method of an electronic document using a digital signature.

Reference numerals 10A to 10C denote terminals having the function to mutually communicate through a network. The user (signatory A) of the terminal 10A drafts a document 1301. A message in a form in which a digital signature SA of the signatory A was added to the document 1301 is transmitted to the terminal 10B. When the user (signatory B) of the terminal 10B approves the contents of the received document 1301, a message in a form in which a new digital signature SB of the signatory B was added to the document 1301 as to follow the digital signature SA which had been received from the terminal 10A is transmitted to the next terminal 10C on the document circulating route. There is now shown the operation in the case where the user C of the terminal 10C verifies the validities of the digital signatures SA and SB added to the above documents.

In the terminal 10A, the digital signature SA is formed in the following manner. First, a hash total of the document data 1301 is obtained by using a predetermined hash function 1302a as a one way function. Signature data 1303a is constructed by a hash total of the document data thus obtained and personal information (for example, data such as a name of the signatory A or the like) of the signatory A which was inputted from a keyboard. A digital signature SA: 1306a is obtained by enciphering (encipher process 1305a) the signature data 1303a by using a secret key 1304a of the signatory A.

In a manner similar to the digital signature SA of the signatory A, the digital signature SB of the signatory B in the terminal 10B is obtained by executing an encipher process 1305b using a secret key 1304b of the signatory B to signature data 1303b which is constructed by a hash total of the document 1301 obtained by using the same hash function 1302b as the hash function 1302a and the personal information of the signatory B.

The validities of the digital signatures 1306a and 1306b in the terminal 10C are verified in the following manner. First, the signature data 1303a and 1303b are obtained by executing decipher processes 1308a and 1308b using public keys 1307a and 1307b of the signatories A and B to the digital signatures 1306a and 1306b, respectively. After that, the hash total of the received document 1301 is produced by using the predetermined hash function 1302c same as the hash functions 1302a and 1302b and is compared with hash totals of the documents included in the signature data 1303a and 1303b (check functions 1309a and 1309b).

Since the above system uses a public key cryptosystem the digital signature can be formed by only the person himself who knows the secret key and a safety can be maintained.

In the case where a document is circulated to a plurality of persons and each person makes a signature indicating that he approves or verifies the contents of the document at each circulating destination location, there is a case where during the circulation, somebody needs to perform a partial change of the document contents such as addition of a comment, correction of wrong words, or the like. There is also a document such that a writing column for each division is previously provided in the document and the document is completed by circulating it to a plurality of divisions to fill up these column.

As mentioned above, by applying the above conventional digital signature to the document whose contents are changed during the circulation, the hash total of the document which is obtained by deciphering one of the digital signatures added to the original or former version before the contents are changed during the circulation does not coincide with the hash total produced from the document data of the latest version.

Therefore, in the case where the final verifier of the document or the signatory on the way of the circulation executes an authenticating operation to the digital signature added to the document by the method used for the terminal C, there is an inconvenience such that in spite of the correction or updating of the document based on a good faith, the result of the judgment indicating that there is an illegality in the document or signature is outputted.

SUMMARY OF THE INVENTION

It is an object of the invention to provide method and system for producing a digital signature, in which a change in contents by the good faith can be permitted for document data to which at least one digital signature has already been given.

Another object of the invention is to provide method and system for authenticating an electronic document having a plurality of digital signatures corresponding to the document contents of different versions, respectively.

Still another object of the invention is to provide an electronic document processing system in which after electronic document data having a digital signature was received and new data was added to the document contents or the document contents were partially changed, a new digital signature can be added.

To accomplish the above objects in an electronic document processing system according to one feature of the present invention, in the case where the user adds new data or changes the document contents for an electronic document which was received from a network and has at least one digital signature which had already been given by another signatory, a digital signature of a user (signatory) is produced by using signature data including a hash total of a document formed by performing a hash total process to the electronic document of a new version, personal information of the user (signatory), and version management information which is necessary to restore the electronic document of the previous version from the electronic document of the new version. For example, the above digital signature is obtained by enciphering the signature data by using a secret key allocated to each user in the public key cryptosystem.

The digital signature is made to correspond to the electronic document of the new version together with the digital signatures of the other signatories added to the electronic document of the former version which was received from the network and is transmitted to the next person of the document circulating route.

In the electronic document processing system of the invention, even in the case where the electronic document of which version was improved by any one of the signatories is received during the circulation, check targets are sequentially selected from the last digital signature and by checking the relation between the digital signature and the electronic document while properly executing a restoring process to the electronic document of the current version, the validities of each digital signature and electronic document can be authenticated.

The relation between the digital signature and the electronic document is checked by a method whereby signature data is obtained by deciphering each digital signature by the public key of the signatory and the hash total of the document data extracted from the signature data is compared with the hash total of the document data obtained by performing the hash total process to the electronic document of the current version.

According to the invention, in the case where the deciphered signature data includes the version management information, the document having former version is restored from the electronic document of the current version by using the version management information so that the correspondence relation between the restored electronic document and next one of the digital signatures can be verified.

For example, in the case where the original electronic document has a plurality of partial regions which have previously been defined and the version of the document is improved by adding document data to one of the partial regions in the electronic documents during the circulation, information to specify one of the partial regions to which the data was newly added is applied as version management information.

In the case of improving the version of the document by inserting data or deleting a part of the existing document data in an arbitrary partial region in the electronic document, for example, the version management information comprises: position information to specify the above partial region; and information to specify the document data deleted from or inserted to the electronic document of the former version.

When an information amount is small, the version management information may be added into a part of the signature data so as to be notified to other persons (terminals) of the circulating route in a form of the enciphered digital signature. When an amount of version management information is large, this information may be directly transmitted as a part of the annexed information of the electronic document.

In the latter case, to make it possible to find out the presence or absence of the illegal altering operation to the version management information during the circulation, for example, it desirable to embed hash total obtained by performing the hash total process to the version management information into the signature data.

According to the above method, in the terminal (electronic document processing system) which received the electronic document, it is able to confirm whether the version management information is legal or not by comparing the hash total of the version management information obtained by deciphering the digital signature with the hash total obtained by performing the hash total process to the version management information received together with the electronic document. After this confirmation of the version management information, restoring of the electronic document of former version may be carried out based on the current electronic document and the verified version management information.

As digital signatures to be sequentially added to the electronic document, the digital signature with the version management information and the digital signature having no version management information can mixedly exist. This is because in the terminal which received the electronic document, the processing targets are sequentially selected from the latest digital signature and version management information and, only in the case where the digital signature as a processing target includes the version management information or its hash total, the restoring process of the electronic document having the former version may be carried out by using the version management information selected as a current processing target.

The foregoing and other objects, advantages, manner of operation and novel feature of the present invention will be understood from the following detailed description when read in conjunction with the accompanying drawings.

BRIEF DESCRIPTION OF THE DRAWINGS

FIG. 7 is a diagram showing a structure of a version management table;

FIG. 11 is a diagram showing a modification of a version management table;

DESCRIPTION OF THE PREFERRED EMBODIMENTS

Figure 1A:
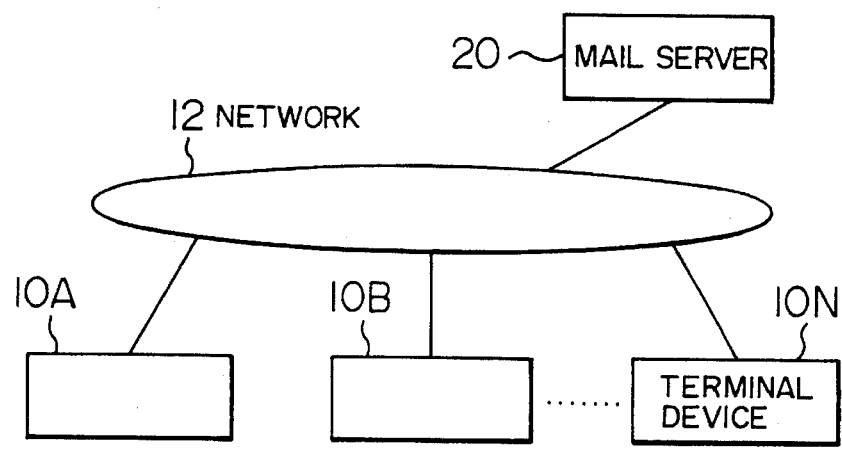
FIG. 1A is a diagram showing a whole construction of an electronic mail system comprising a plurality of terminals to which the invention is applied.

FIG. 1A is a block diagram showing a construction of a mail communication system including a plurality of document processing terminals having a digital signature function according to an embodiment of the invention.

In FIG. 1A, reference numeral 10 (10A, 10B to 10N) denote terminal devices which are mutually connected by a communication network 12. As will be explained hereinlater, each terminal 10 has a function to form a document, a function to form and verify a digital signature, and a function to communicate with another terminal. Explanation will now be made of the assumption that electronic document data (hereinafter, simply referred to as document data) with at least one digital signature is transmitted from one terminal to another terminal through the communication network 12 along a circulating route of the document which has previously been designated. However, it will be obviously understood that by interposing a mail server 20 into the communication between the terminals and by accessing the mail server 20 from each terminal, the document data can be circulated.

Figure 1B:
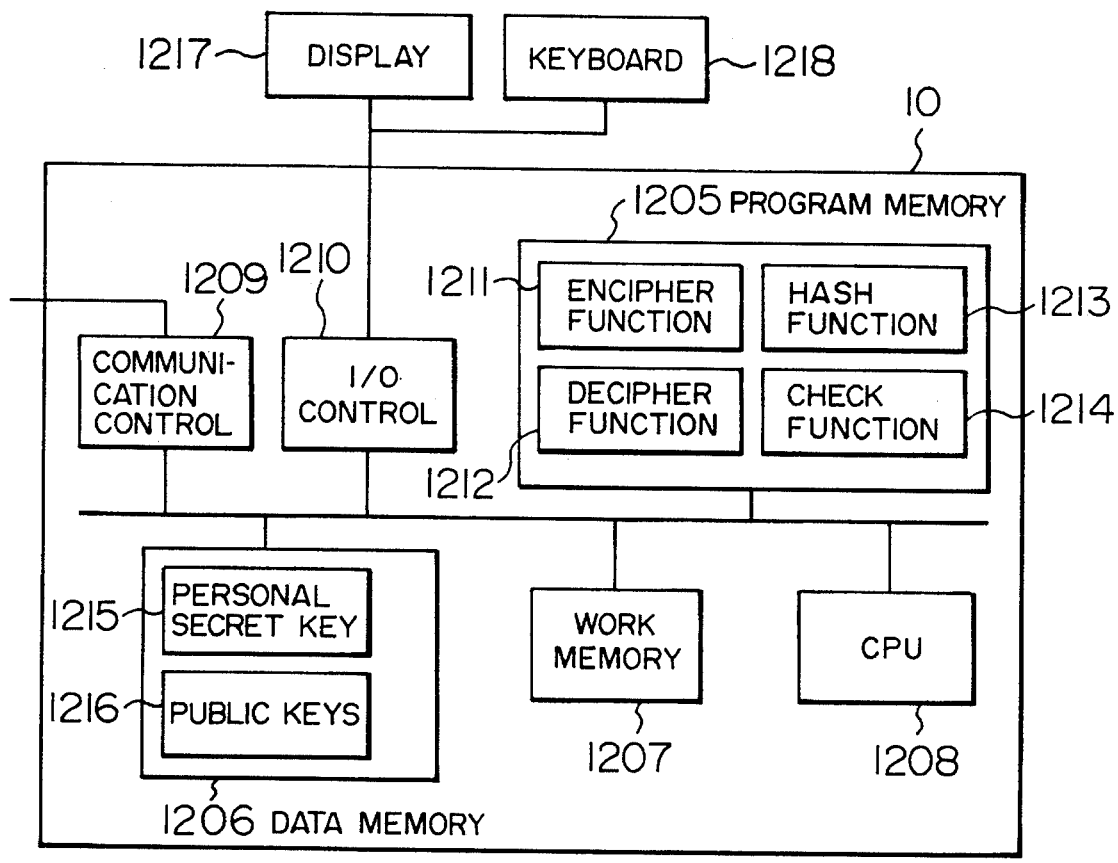
FIG. 1B is a block diagram showing a construction of a terminal.

As shown in FIG. 1B, the terminal 10 includes: a display 1217; a keyboard 1218; a memory 1205 to store various kinds of programs; a data memory 1206 to store data that has previously been registered; a work memory 1207 to temporarily store data generated during execution of the program; a CPU (central processing unit) 1208; a communication control 1209; and an I/O control 1210.

A plurality of programs and a plurality of functions (modules) for producing and checking digital signatures, which will be explained hereinlater, are stored in the program memory 1205. More specifically, a function 1211 for an encipher process; a function 1212 for a decipher process; a function (hash function) 1213 for a data hash process; and a function 1214 to check authentication data are stored in the program memory 1205.

The data memory 1206 has: an area 1216 to store public keys of a plurality of users who use the electronic mail system and have previously been registered; and an area 1215 to store a secret key of the user who uses the terminal. The secret key and the public keys can be read out by designating an identification number ID of the user, respectively.

Figure 2A:
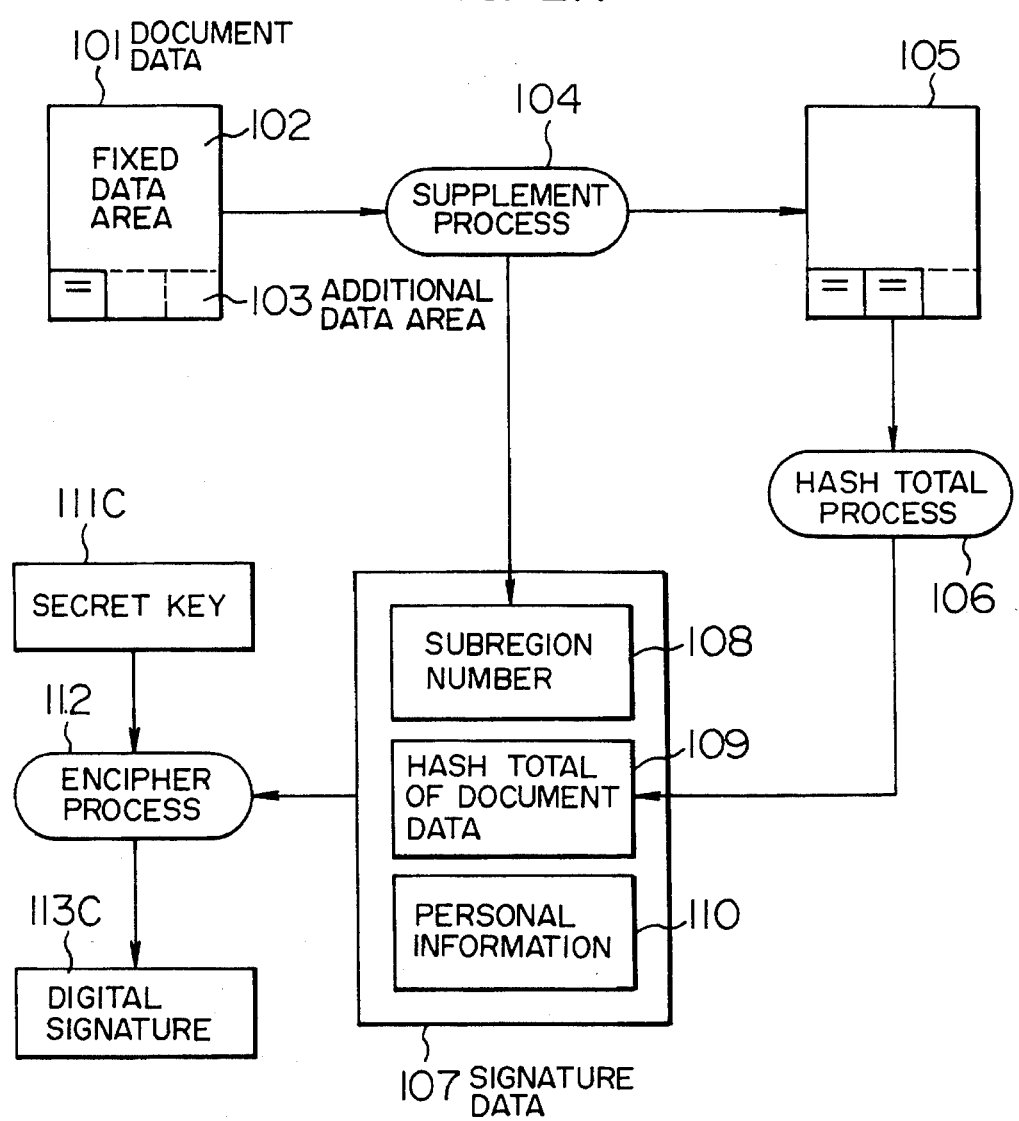
FIG. 2A is a diagram for explaining the first embodiment of a digital signature forming procedure according to the invention.

FIG. 2A is a diagram for explaining the first embodiment of a method of forming a digital signature which is executed at one of the above terminals 10. FIG. 2A shows such a procedure that document data 101, which was formed by the user (signatory) A at the terminal 10A and to which a digital signature 113A of the user A and a digital signature 113B of the next user B have already been added, is received by the user C of the terminal 10C and the contents of the document are partially changed and, after that, a digital signature 113C of the user C is added to the resultant document data.

In this embodiment, the document 101 which is sequentially circulated to a plurality of users comprises: a fixed data area 102 in which the change of the contents is not permitted; and an additional data area 103 into which data is added at the terminal on the circulating destination side. The fixed data area 102 includes the document data presented by the document drafter A who makes the signatures for the first time. It is not permitted that the persons other than the first signatory A change the document contents in the fixed data area 102 of the received document.

The second and subsequent signatories write proper data into the additional data area 103 which has previously been defined in the received document 101, so that the document is sequentially circulated while increasing an information amount. In the example shown here, the additional data area 103 of the document 101 is divided into three subregions, there is shown a state in which the former signatory B added the data into the first subregion, and the signatory C adds the data into the second subregion.

The signatory C as a user of the terminal 10C first operates a keyboard 1218 and executes a supplement process 104 of the document data when the received document data 101 is outputted to the screen of a display 1217. Thus, updated document data 105 in which the data was added to the second subregion in the additional data area 103 is produced. The invention is characterized in that in the case where when each signatory makes the digital signature after the document data was updated, information (subregion number 108) to specify the portion whose data was corrected now, namely, the subregion into which the data was added in the embodiment is included in a part of the signature data (authentication data) as version management information.

After the document data was updated, the signatory C executes a hash total process 106 to the updated document data 105 by using the hash function 1213 to produce a hash total 109 of the document data. The hash total 109 constructs signature data 107 together with personal information 110 such as a name and the like of the signatory C and the subregion number 108. By executing an encipher process 112 to the signature data 107 by using a secret key 111 peculiar to the signatory C, the digital signature 113C indicating that the signatory C approved the document data 105 is produced.

Figure 2B:
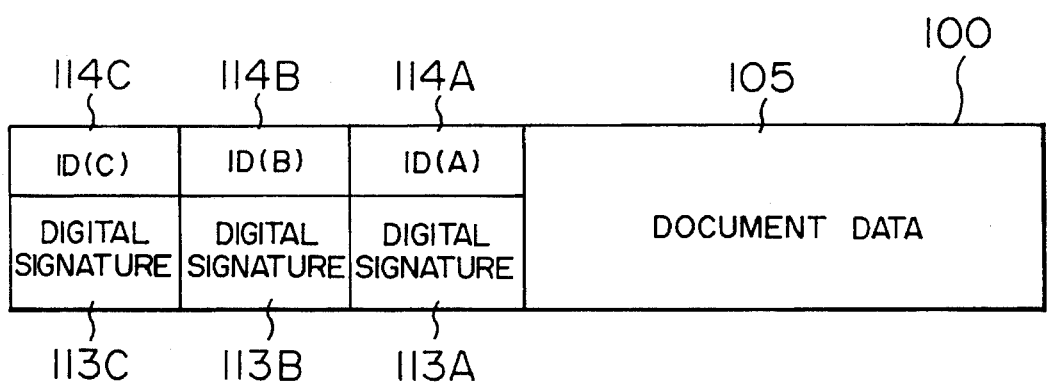
FIG. 2B is a diagram showing a construction of a communication message in the first embodiment.

The signatory C sends the document data 105, the digital signatures 113A and 113B of the other users which were received together with the document data 101, and the new digital signature 113C which was newly produced this time to the next signatory (or verifier) by a form of a communication message 100 shown in FIG. 2B. To show the correspondence relation between each of the digital signatures 113A to 113C and public keys, which will be explained hereinlater, identifiers IDs 114A to 114C of the signatories are set into the communication message 100 so as to form a pair together with each of the digital signatures 113A to 113C. In FIG. 2B, for simplicity of the drawing, a header portion including information such as transmission destination side address, transmitting side address, and the like of the communication message is omitted.

Figure 3:
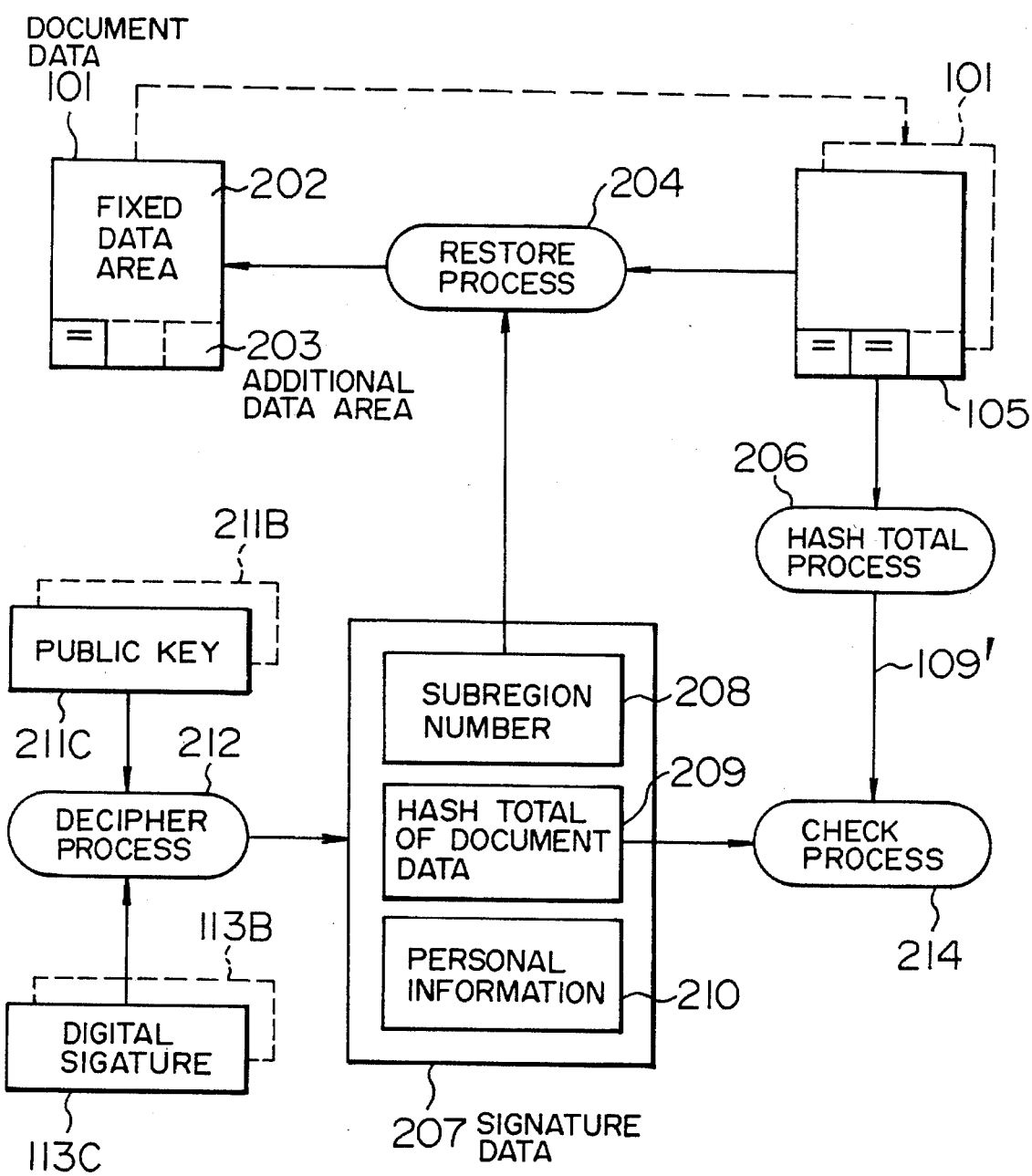
FIG. 3 is a diagram for explaining a confirming procedure of a digital signature in the first embodiment.

FIG. 3 shows a verifying process of the digital signature which is executed as a pre-process of the signature operation mentioned above in the terminal device which received the communication message including the document data or is executed to verify the validity of the signature by the final verifier of the circulated document data.

The operation of the terminal device 10D which received the communication message 100 including the digital signatures 113A to 113C will now be described as an example.

In the terminal device 10D, a hash total process 306 similar to the process 106 in FIG. 2A is executed to the document data 105 extracted from the received message by using the hash function 1213 in order to obtain a hash total 109' of the document data. Among the digital signatures 113A to 113C extracted from the received communication message 100, the digital signatures are sequentially set to check target signatures in accordance with the order from the last signature. First, the digital signature 113C is selected as a check target signature. A public key 211C of the signatory C is read out from a public-key memory area 1216 on the basis of the identifier 114C of the signatory C which forms a pair together with the check target signature. A decipher process 212 is performed to the digital signature 113C by using the public key 211C, thereby obtaining signature data 207.

The document hash total 109' obtained by the hash total process 206 and a hash total 209 of the document data extracted from the signature data 207 are subjected to a check process 214 and a check is made to see if those two hash totals of the document data coincide or not. When they don't coincide, it is determined that an illegal alteration was performed to the document data 105 or digital signature 113C.

When it is verified by the above check process 214 that the two document hash totals 109' and 209 coincide, on the basis of the subregion number 108 extracted from the signature data 207, a subregion in the document data 105 into which the signatory C added the data is specified and the data included in this subregion is deleted (process 204) to restore the former version document data. Due to this, the document data 101 which was approved by the signatory B just before the signatory C is restored.

The document data 101 and the next digital signature 113B are set to new check targets, after a hash total process 206 of the document data 101 and the decipher process 212 of the digital signature 113B are executed, the check process 214 and the restore process 204 of the document are executed. Thus, the document data which doesn't include the additional data in an additional data area 203 and which was approved by the signatory A is restored. Therefore, by repeating the above processing operations 206, 212, and 214 to the document data, the validity of the digital signature 113A can be verified.

According to the embodiment as mentioned above, by repeating the checks of the digital signatures in accordance with the order from the last signatory and the document data restore process of the former version based on the data additional subregion number, the validities of the digital signatures with respect to all of the signatories can be verified.

Figure 4:
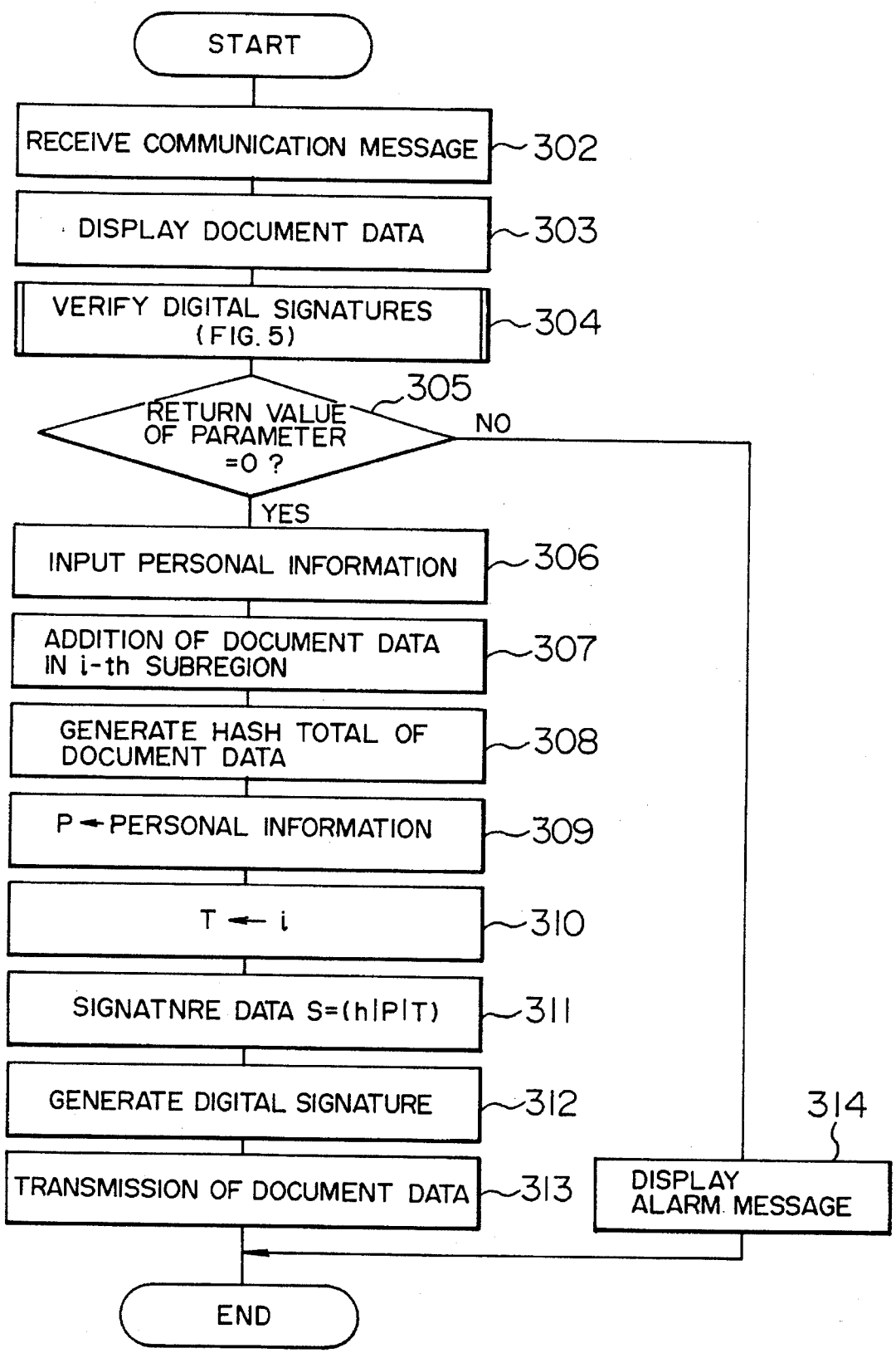
FIG. 4 is a flowchart for a program to confirm and produce a digital signature.

FIG. 4 is a flowchart of a program to realize the foregoing document authentication and digital signature in each terminal 10. According to the flowchart, the terminal is handled on the assumption that the terminal corresponds to the n-th signatory of an arbitrary order in the circulating route of the document.

Figure 5:
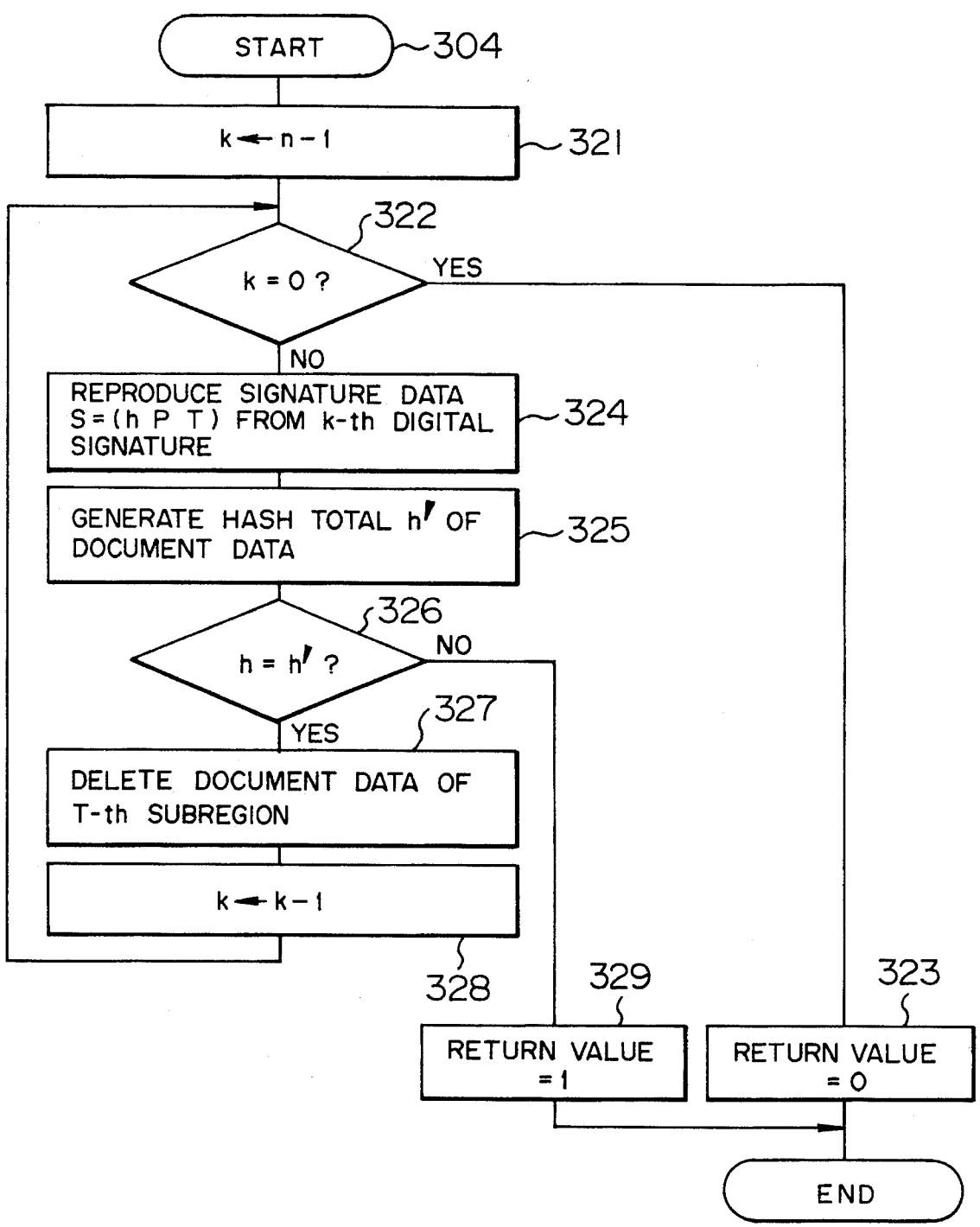
FIG. 5 is a flowchart showing the details of a signature verifying processing routine 304 in FIG. 4.

When the document data (communication message) to which (n−1) signatures were added until the former circulating person is received (step 302), the document data is displayed on the display (step 303). A signature verifying processing routine, which will be explained in detail in FIG. 5, is executed (step 304). The result of the verification in the above signature verifying processing routine is shown by a return value of a parameter. The return value of the parameter is checked (step 305). If the return value is equal to "1", it means that there is an illegal alteration. In this case, a message indicating that the document data or signature is invalid is displayed on the display and the program is finished (step 314).

If the return value is equal to "0", it means that all of the signatures added to the document data are legal. In this case, a message indicating that the signatures are legal is displayed on the display and the user is allowed to input persona information such as a name and the like and, after that, the input of the additional data to the document is permitted (step 306). In step 307, the additional data such as comment and the like inputted from the keyboard is written into the i-th subregion in a blank state in the additional data area 103. After the additional data was written, in step 308, a hash total process is executed to the document data and a hash total h of the document data is produced. The personal information inputted in step 306 is now substituted for a variable P (step 309). The number i of the data additional subregion is substituted for a variable T (step 310) and signature data S is formed (step 311). The signature data is expressed by S=(h|P|T). Symbol "|" denotes the coupling of the data.

An encipher process using the secret key of the signatory is executed to the signature data S (step 312) and a digital signature is produced. In step 313, a communication message is edited so as to include the document data 105 which was updated this time, the digital signatures 113A to 113(n−1) of the other users, and a new signature 113n which was formed this time and is transmitted to the next circulating person.

The circulating route of the document is generally displayed by characters into a predetermined region in the document 101. It is, however, possible to construct in a manner such that the ID and address of each user as a circulation destination side are preset into a control information region of the communication message and, when the process of the digital signature is finished at one terminal, the message is automatically transferred to the next person.

FIG. 5 is a flowchart showing the details of the signature verifying processing routine 304.

First, the number "n−1" of digital signatures included in the received message is substituted for a variable k indicative of the total number of signatures as check targets (step 321).

A check is now made to see if k=0 or not (step 322). When k=0, it means that there is no signature to be checked. In this case, "0" is set into a return code (step 323) and the processing is returned to the program of FIG. 4. If k≠0, a decipher process using the public key of the signatory is executed to the k-th digital signature and the signature data S=(h|P|T) is produced (step 324). After that, a hash total process is executed to the document data to obtain a hash total h' of the received document data (step 325). The document hash total h extracted from the deciphered signature data is compared with the hash total h' (step 326).

When h≠h', it is decided that an illegal alteration was performed. In this case, "1" is set into the return code (step 329) and processing is returned to the program of FIG. 4. If h=h', it is determined that the signature is legal. In this case, the data written in the T-th subregion in the additional data area of the received document is deleted on the basis of the position information T extracted from the deciphered signature data (step 327). After that, "1" is subtracted from the value of the variable k (step 328) and the processing is returned to discriminating step 322.

In this routine, by repeating the process in step 327, the document data is sequentially changed to the former version. However, the latest document data itself to be transmitted to the next signatory has been preserved in another memory area. The document data to be circulated is not lost by the execution of the above processing routine.

According to the embodiment, each signatory can add the additional data such as a comment and the like to the circulated document. Even when the document as a target of the digital signature is modified by the addition of such data during the circulation, according to the invention, the document data of the version corresponding to each digital signature can be restored. Therefore, there is no fear such that the legal signature is erroneously judged as an illegal signature.

Figure 6A:
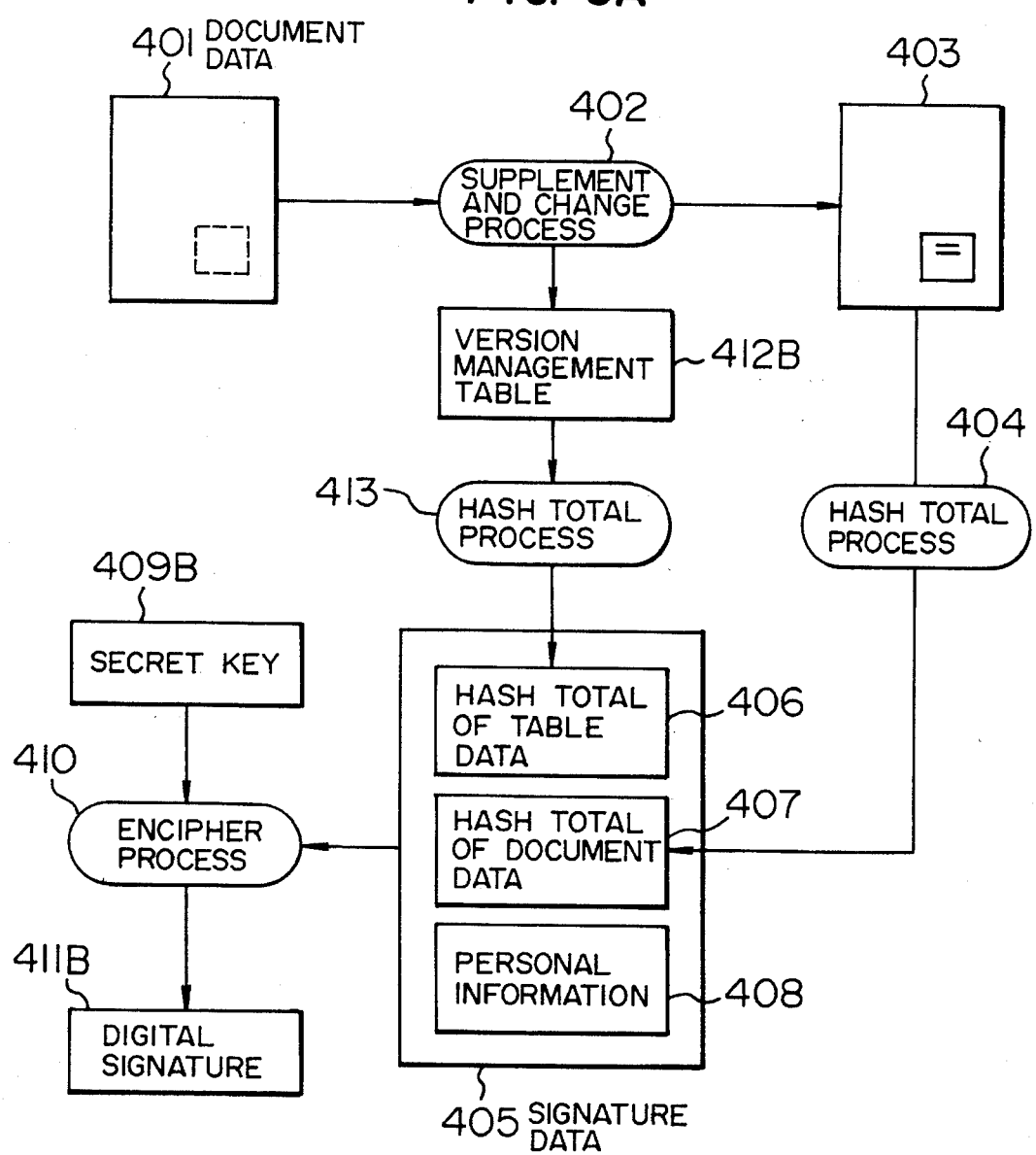
FIG. 6A is a diagram for explaining the second embodiment of a digital signature forming procedure according to the invention.

FIG. 6A shows the second embodiment of a method of forming a digital signature according to the invention.

In the example, the signatory B changes the document contents in an arbitrary region of document data 401 received from the drafter A of the document (supplement and change process 402) and executes a digital signature to the updated document data 403. The contents of the change (addition of data, substitution or deletion of data) performed by the signatory B to the received document are recorded into a version management table 412B, which will be explained in FIG. 7, and are transmitted to the next signatory together with the updated document data.

The digital signature is executed in the following manner. A hash total process 404 is executed to the updated document data 403 and a hash total 407 of the document data is produced. Another hash total process 413 is executed to the version management table 412B to obtain a hash total 406 of the version management table 412B. Signature data 405 comprises the hash totals 406 and 407 and personal information 408 such as a name and the like of the signatory B. An encipher process 410 using a secret key 409B of the signatory B is executed to the signature data 405, thereby producing a digital signature 411B.

Figure 6B:
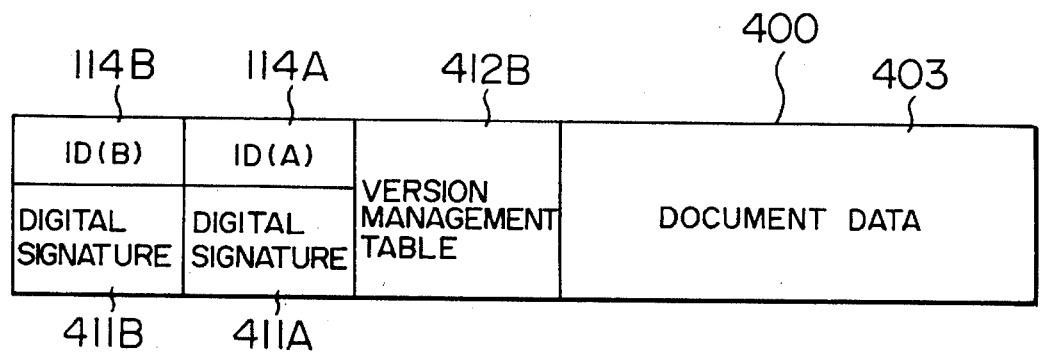
FIG. 6B is a diagram showing a construction of a communication message in the second embodiment.

The updated document data 403, version management table 412B, and digital signature 411B are transmitted to the next signatory (or verifier) together with a preceding digital signature 411A in a form of a communication message 400 as shown in FIG. 6B. In the case where a part of the contents of the received document has already been updated by anyone (N) of the previous signatures, an update management table 412M which was newly formed by a latter signatory M is inserted into a communication frame in a form subsequent to an update management table 412N which already existed.

As shown in FIG. 7, the version management table 412 (412B, 412N, 412M) comprises a plurality of records 505, 506, . . . each of which is produced every area in which the data was changed. Each record includes: a field 501 to store a code indicative of the kind of data change; a field 502 to store the address indicative of the head position of the partial region in the document in which the data was changed; a field 503 to store the size of data which was newly inserted into the above area by the supplement and change process 402; and a field 504 to store the data deleted from the above area by the supplement and change process 402.

There is the following relation between the value of the code to be set into the field 501 and the processing content.

"1": addition of data
"2": substitution of data
"3": deletion of data

In the example shown in FIG. 7, for instance, the record 505 denotes that the old data "ujr8 . . . 8yl" existed in the partial area starting from the address "279120" in the received document was replaced to the new data of a character string of a length "3200". The above new data exists in the updated document data 403. The record 506 denotes that the data of a character string of a length "458" was inserted into the partial area starting from the address "891236" in the received document. The record 507 denotes that the data "kht . . . 45oj" existed in the partial area starting from the address "114031" was deleted.

Figure 8:
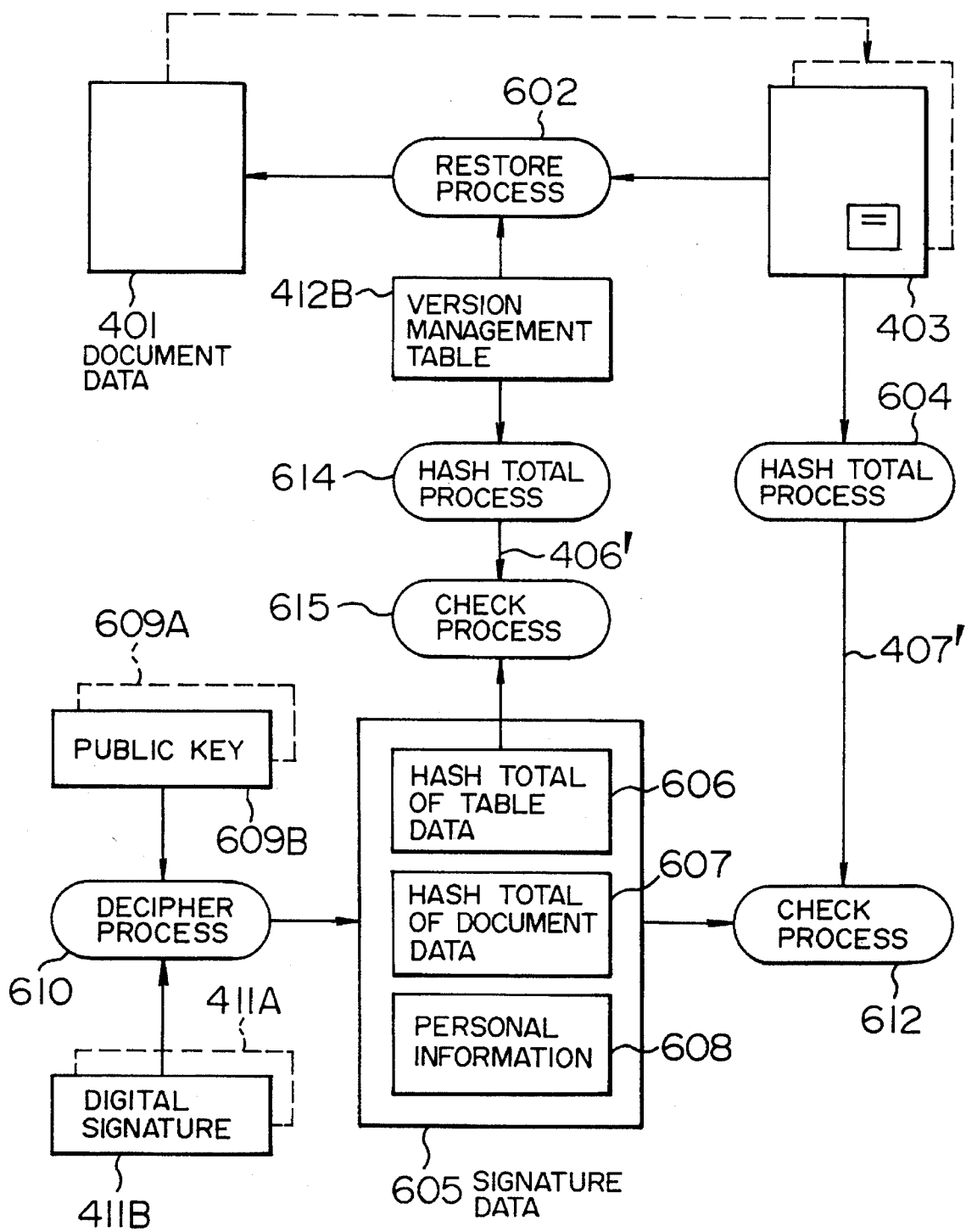
FIG. 8 is a diagram for explaining a verifying procedure of a digital signature in the second embodiment.

FIG. 8 shows a procedure for verification of the validity of the digital signature which is executed in the terminal device 108 which received the document data accompanied with the above version management table 412.

First, a hash total 407' of the received document data is formed by executing a hash total process 604 to the received document data 403 extracted from the received message. A decipher process 610 is executed to the digital signature 411B extracted from the received message by using a public key 609B of the signatory B to obtain signature data 605. The hash total 407' of the document obtained by the hash total process 604 is compared with a hash total 607 of the document data extracted from the signature data 605 (check process 612), thereby judging whether they coincide or not. When they differ, it is determined that an illegal alteration was performed to the document data 403 or digital signature 411B.

When it is confirmed that those two hash totals coincide, a hash total process 614 is executed to the version management table 412B of the signatory B which was extracted from the received message, thereby forming a hash total 406' of table data. The table hash total 406' thus obtained is compared with a table hash total 606 extracted from the signature data 605 (check process 615), thereby judging whether those hash totals coincide or not. When they differ, it is determined that an illegal alteration was performed to the version management table 412B or the digital signature 411B.

When the coincidence of those two table hash totals is confirmed, a restore process 602 is executed to the document data 403 on the basis of the contents of each record of the version management table 412B, thereby obtaining the document data 401 of the former version which was authenticated by the signatory A.

In the above restore process 602, the deletion of the added partial data from the document data 403 (in the case where the code is equal to "1" or "2") and the insertion of the deleted data defined in the field 504 into the document data 403 (in the case where the code is equal to "2" or "3") is executed in accordance with the contents of code field 501 of each record of the version management table 412 (412B)

shown in FIG. 7.

By repeating the above-mentioned processes to the restored document data 401 and the digital signature 411A of the signatory A extracted from the received message as check targets, the validity of the digital signature 411A can be judged.

According to the embodiment as mentioned above, the judgment above the validity of the digital signature and the restore process of the document data of the former version are repeated in accordance with the order from the last signatory. Thus, even in the case where the contents were updated in an arbitrary portion of the document during the circulation, the validities of the digital signatures of all of the signatories can be verified.

Figure 9:
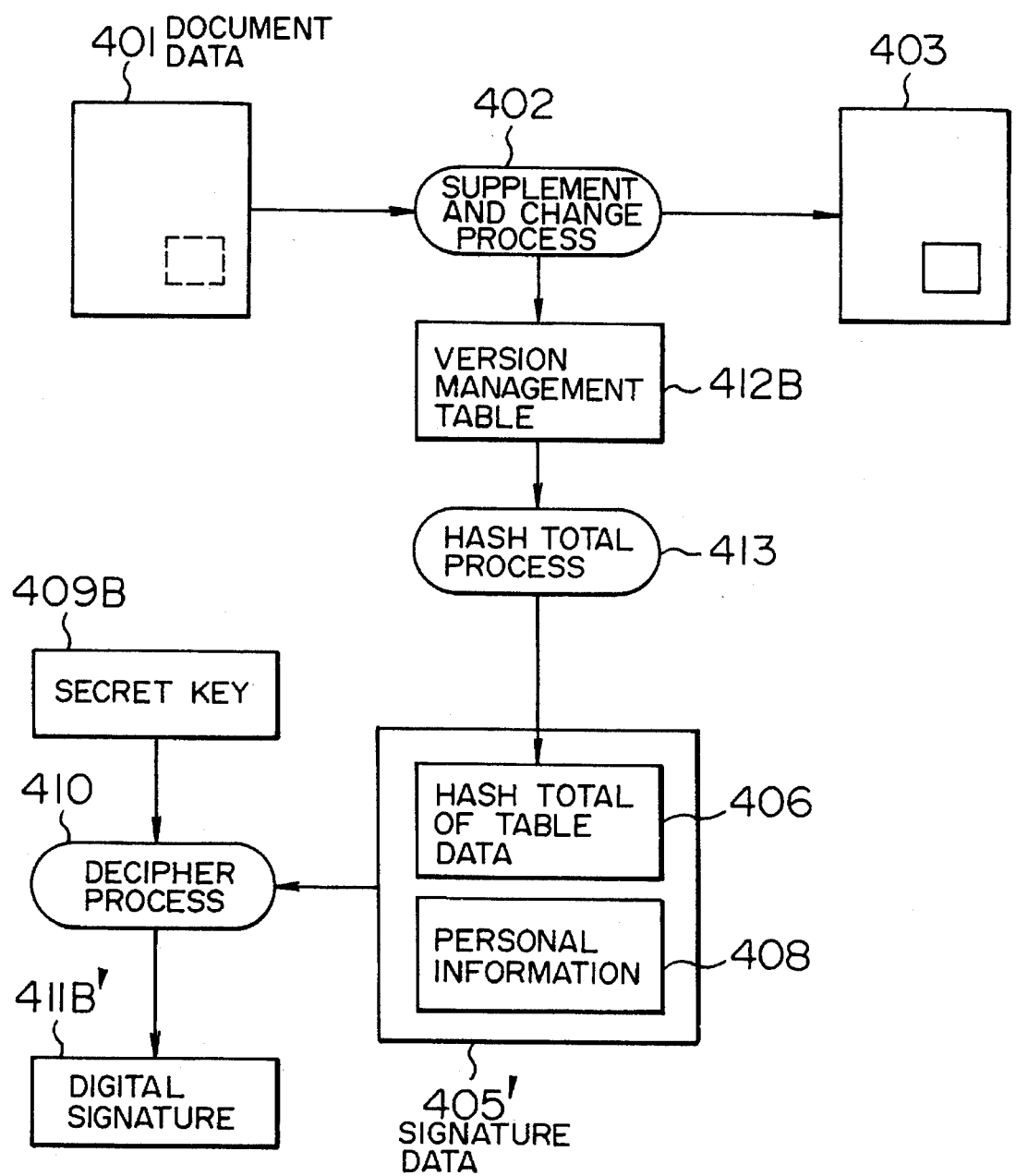
FIG. 9 is a diagram for explaining the third embodiment of a digital signature forming procedure according to the invention.

FIG. 9 shows a modification of a method of forming a digital signature shown in FIG. 6A.

In the embodiment, the drafter of the document performs an encipher process to the signature data comprising the hash total of the document data and the personal information in order to produce the digital signature. The second and subsequent signatories construct signature data 405' by the hash total 406 of the update management table 412B and the personal information 408 of the signatory and execute an encipher process 410 using a secret key 409B of the signatory B to the signature data 405' including no hash total of the document data, thereby producing a digital signature 411B'.

The forming method of the digital signature mentioned above is, for example, effective to a document having a structure such that a special comment area in the document is allocated to each signatory on the circulating destination side and each signatory certainly updates a part of the document.

Figure 10:
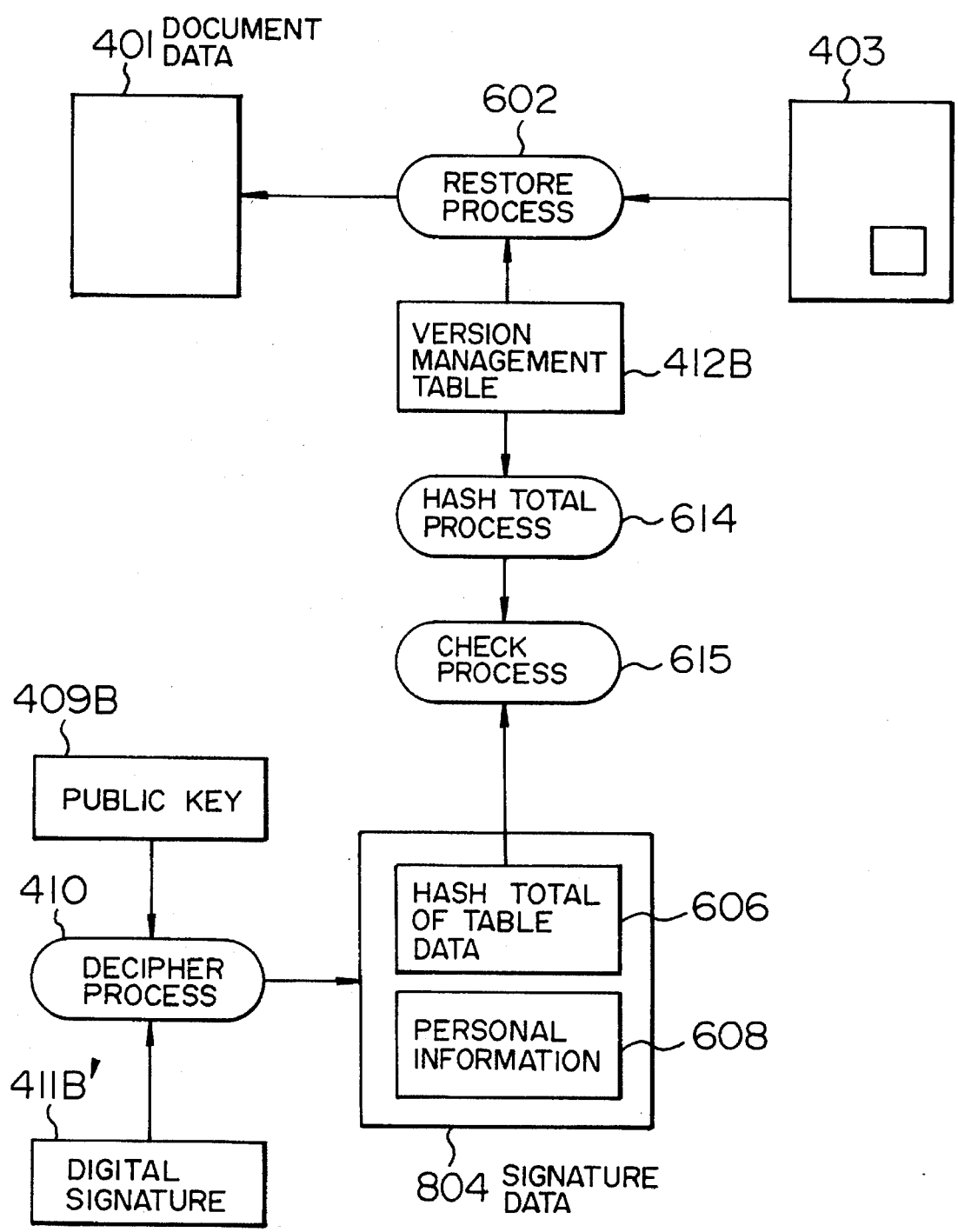
FIG. 10 is a diagram for explaining a verifying procedure of a digital signature in the third embodiment.

FIG. 10 shows a procedure to verify the validities of the second and subsequent digital signatures which is executed by the terminal 10B which received the document data having the digital signature produced by the method shown in FIG. 9.

The operation similar to the operation described in FIG. 8 is executed except a point that the formation and check (processes 604 and 612 in FIG. 8) of the hash total of the document data are omitted. With respect to the first signatory, as shown in FIG. 8, the hash total obtained by performing the hash total process to the document is compared with the document hash total extracted from the signature data, thereby judging the validity.

According to the embodiment, since a part of the check regarding the hash total of the document, the authenticating operation can be performed at a high speed.

FIG. 11 shows a modification 900 of the version management table 412.

An update management table 900 shown here is commonly used by a plurality of signatories. Each of records 907 to 911 comprises: field 901 to store a personal identifier of the signatory; a field 902 to store a code indicative of the kind of updating process; a field 903 to store an address indicative of the head position of the partial area in the document in which the data was changed; a field 904 to store the size of data which was newly inserted into the above area by the supplement and change process 402; a field 905 to store the data which was deleted from the above area by the supplement and change process 402; and a field 906 to store the digital signature.

As shown in the record 907, the drafter of the document data as a first signatory registers the personal identifier, a code "0" indicating that the document is not updated, and the digital signature into a table.

The signatory who changed a part of the received document data produces a record for every corrected portion and registers the personal identifier and the version management information (902 to 905) into each record in accordance with a definition similar to that described in FIG. 7. The signatory who performed the data correction to a plurality of partial areas registers the digital signature to the field 906 in the last record. Among the signatories other than the drafter of the document, the signatory who does not change the received document data registers the personal identification information of the signatory, code "0", and digital signature as shown in, for example, a record 910.

In case of using the above version management table format, a communication message which is transmitted or received by each terminal has a frame format comprising latest document data and a subsequent version management table.

Figure 12:
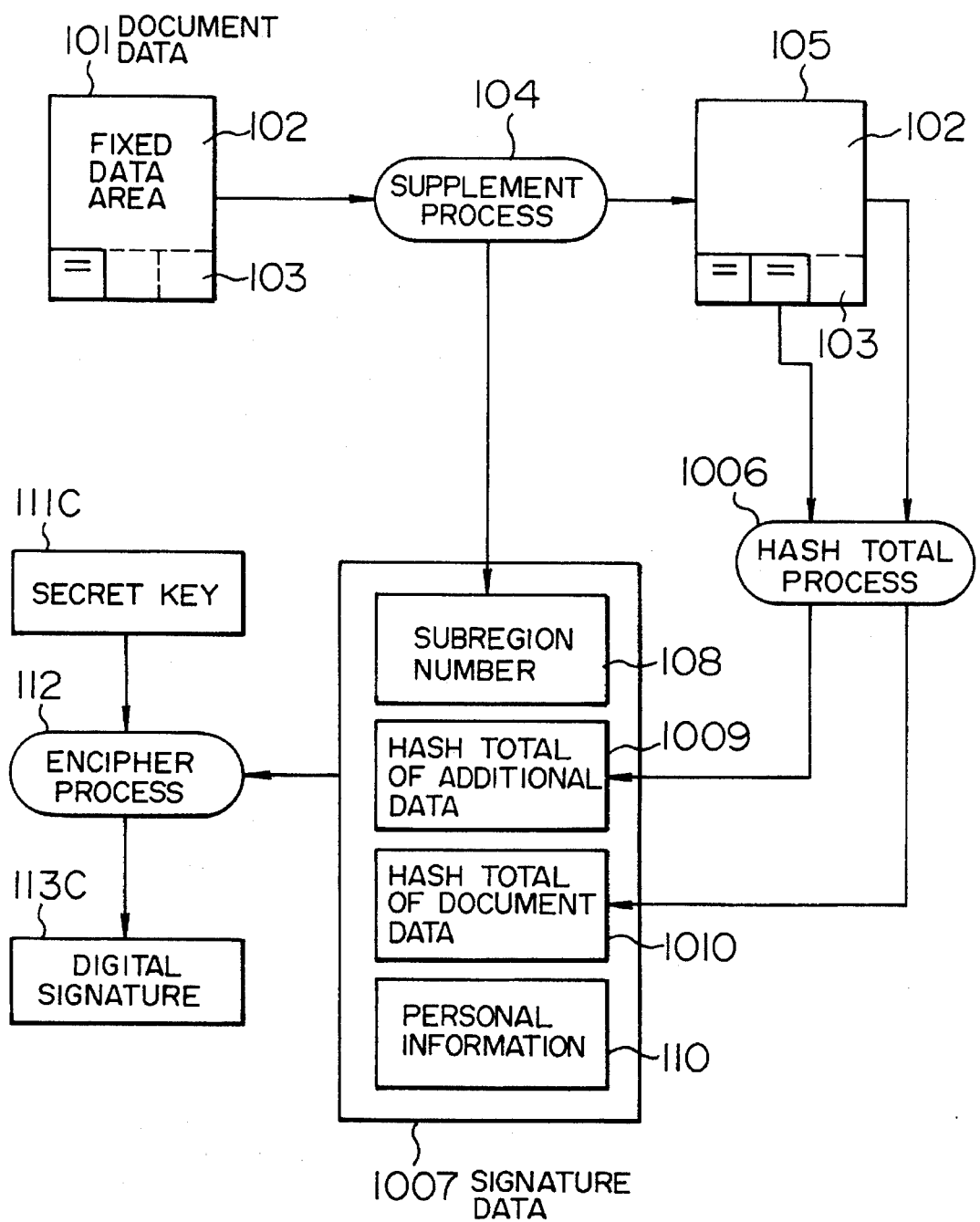
FIG. 12 is a diagram for explaining the fourth embodiment of a digital signature forming procedure of the invention.

FIG. 12 shows a modification of the digital signature forming method described in FIG. 2A.

In the example, a document area as a processing target is divided into two areas by a hash total process 1006 of the document and a hash total 1010 of the data included in the fixed data area 102 of the document data 105 and a hash total 1009 of the data included in the additional data area 103 are individually produced.

Signature data 1007 is constructed by the hash totals 1009 and 1010, personal information 1011, and subregion number. The encipher process 112 using a secret key 111C of the signatory C is executed to the signature data 1007, thereby forming a digital signature 1013C.

Figure 13:
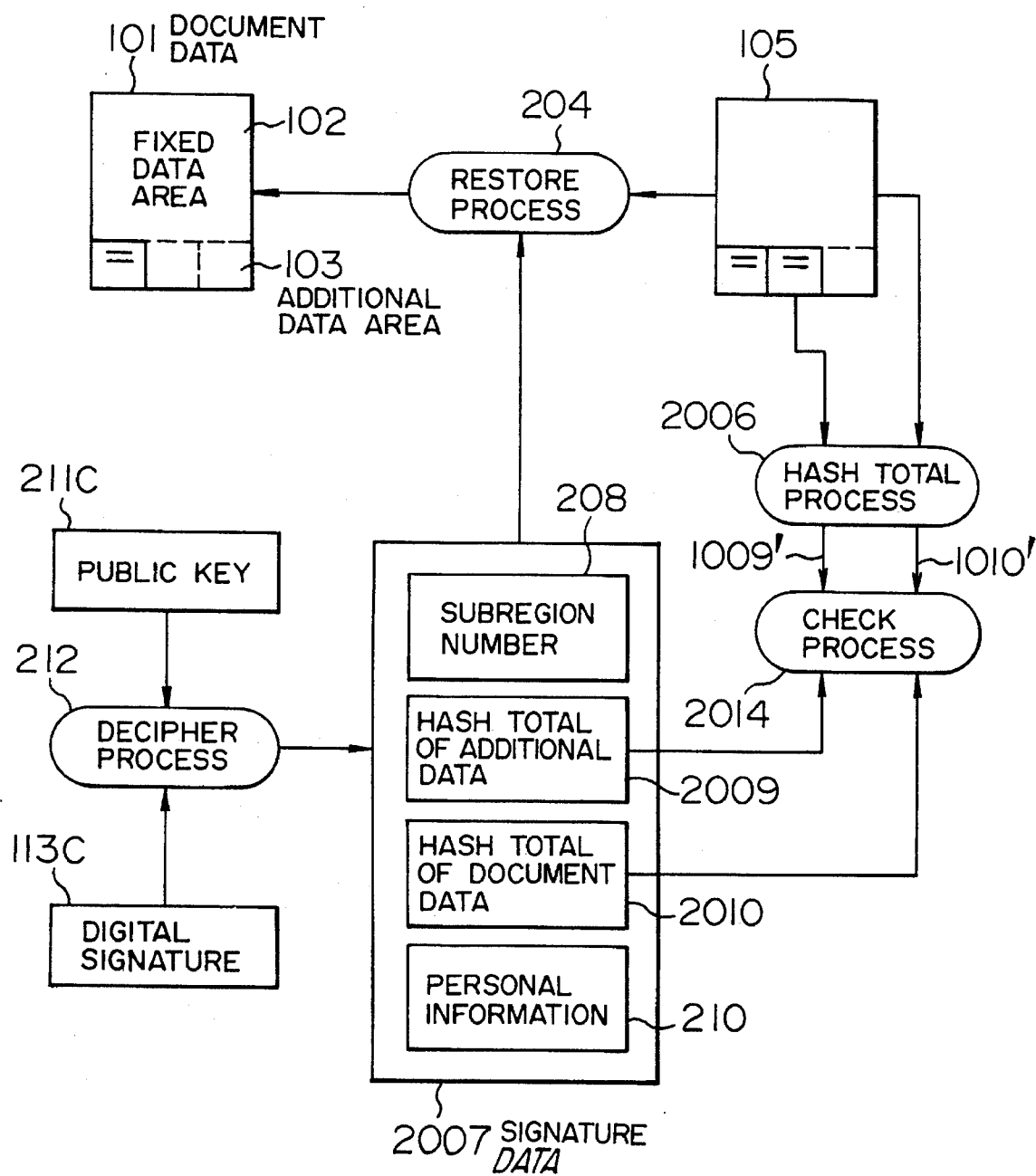
FIG. 13 is a diagram for explaining a verifying procedure of a digital signature in the fourth embodiment.
Figure 14:
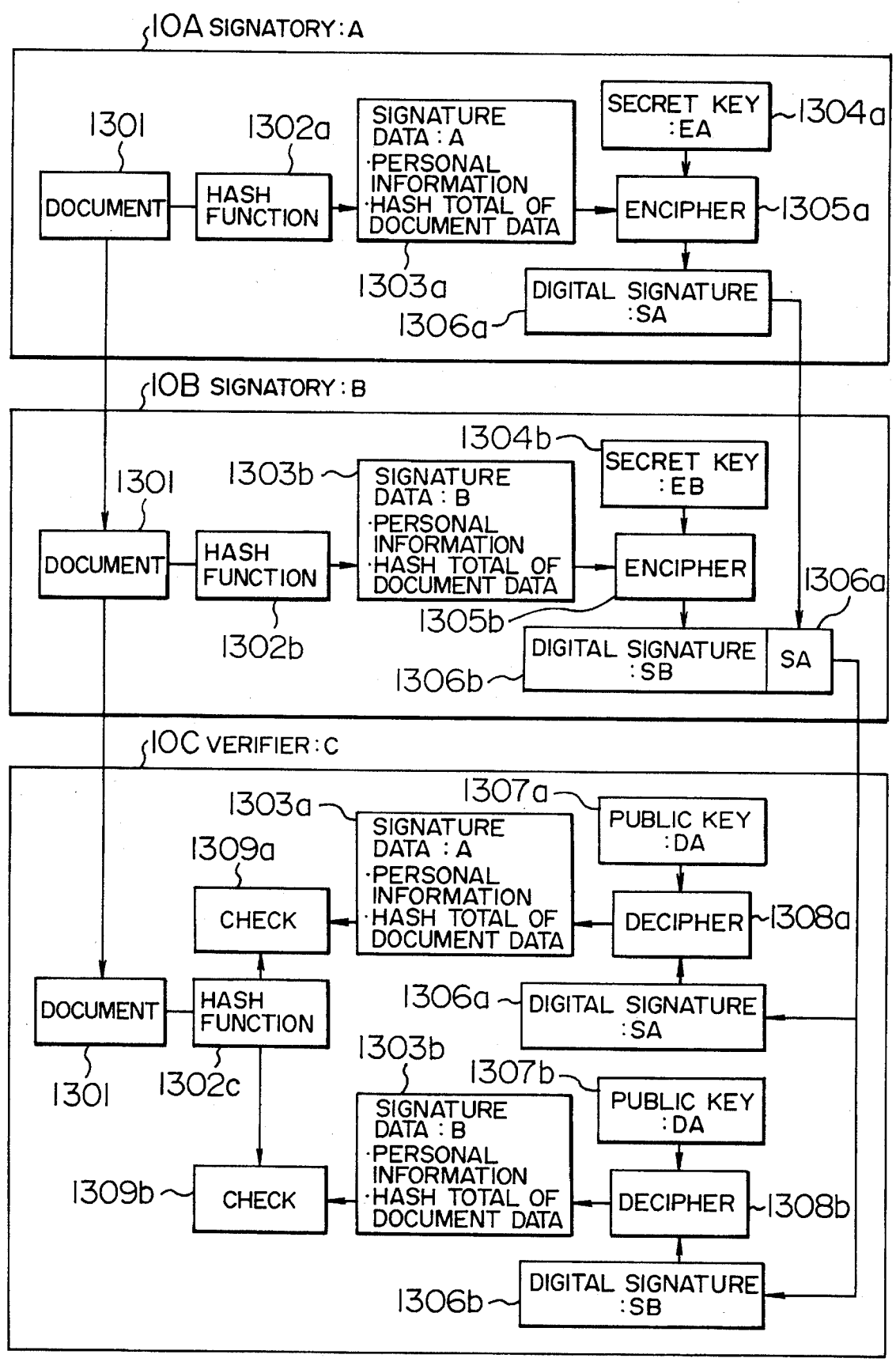
FIG. 14 is a diagram for explaining a conventional processing method of a digital signature.

FIG. 13 shows a verifying procedure of the signature which is executed in the terminal 10D which received the document data accompanied with the above digital signature 1013C.

The terminal 10D executes a hash total process 2006 to the received document data 105 extracted from the received message and forms a hash total 1010' of the data included in the fixed data area 102 and a hash total 1009' of the data included in the additional data area 103. Signature data 2007 is obtained by executing a decipher process 1114 to the digital signature 113C extracted from the received message by using the public key 211C of the signatory C.

The validity of the digital signature 113C is verified by discriminating the coincidence by a check process 2014. Namely, a check is made to see if the data hash total 1010' regarding the fixed data area 102 coincides with a data hash total 2010 extracted from the signature data 2007 or not and a check is also made to see if the data hash total 1009' regarding the additional data area 103 coincides with the data hash total 2009 extracted from the signature data 2007 or not.

According to the embodiment, there is an advantage such that when an abnormality is detected in the digital signature, it is possible to determine that the alteration position of the document data exists in which one of the fixed data area 102 and the additional data area 103.

What is claimed is:

1. A method of forming a digital signature to be added to an electronic document, comprising the steps of:

generating a former version electronic document;

performing a hash total process to said former version electronic document to generate a former version hash total;

performing an encipher process with at least said former version hash total and personal information of a signatory to generate a first digital signature;

adding the first digital signature to the former version electronic document;

changing the former version electronic document of a former version to which at least said first digital signature has already been added to generate a new version electronic document;

creating version management information which describes the change between the former version and new version electronic documents;

performing a hash total process to said new version electronic document to generate a new version hash total;

performing an encipher process with at least said new version hash total, personal information of another signatory, and said version management information to generate a new digital signature; and altering at least a part of said first digital signature to correspond to said new version electronic document.

2. A method according to claim 1, wherein said encipher process is executed using a secret key allocated to said signatory in a public-key cryptosystem.

3. A method according to claim 1, wherein said electronic document of the former version has a plurality of partial regions which have previously been defined to accommodate additionally write data;

the electronic document of the new version is formed by newly adding the document data into one of said plurality of partial regions in the electronic document of the former version; and said version management information comprises information to specify one of the partial regions into which the document data was newly added.

4. A method according to claim 3, wherein said hash total of the document data comprises:

a first hash total obtained by performing the hash total process to the document data included in said plurality of partial regions in said electronic document of the new version; and a second hash total obtained by executing the hash total process to the document data included in the other regions in the electronic document of the new version.

5. A method according to claim 1, wherein said electronic document of the new version is formed by inserting new document data into or deleting a part of existing document data from at least one of the partial regions in the electronic document of the former version; and said version management information comprises the positions of the partial regions and information to specify the document data deleted from the electronic document of the former version and the new document data inserted.

6. A method of forming a digital signature to be added to an electronic document, comprising the steps of:

changing a former version electronic document to which at least a first digital signature has already been affixed to form a new version electronic document;

creating version management information which describes how to restore the former version electronic document from the new version electronic document;

performing a hash total process to the new version electronic document to form a first hash total;

executing a hash total process to said version management information to form a second hash total;

performing an encipher process to signature data including said first and second hash totals and personal information of a signatory to form a new digital signature; and relating said version management information, said first digital signature, and said new digital signature to said new version electronic document.

7. A method according to claim 6, wherein said encipher process of the signature data is executed by using a secret key allocated to the signatory in a public-key cryptosystem.

8. A method according to claim 6, wherein said new version electronic document is formed by one of (1) inserting new document data into or (2) deleting existing document data from at least one of a plurality of partial regions in the new version electronic document; and said version management information comprises positions of the partial regions and information to specify (1) the document data deleted from the former version electronic document and (2) the new document data inserted into the former version electronic document.

9. A method according to claim 8, wherein a table comprising a plurality of records is related with the electronic document of the new version; and each of said records stores an identifier of one of said signatories, and at least one of said version management information and said digital signatures.

10. A method of authenticating an electronic document, in which a message is received, which message includes a current version electronic document and a plurality of digital signatures added to said current version electronic document in accordance with a predetermined order, and at least one of said digital signatures having been obtained by encrypting signature data including personal information of a signatory, a hash total obtained by performing a hash total process to a former version of the electronic document corresponding to said at least one digital signature, and version management information necessary for restoring the current version electronic document to the former version electronic document corresponding to the at least one digital signature, comprising the steps of:

(a) setting the current version electronic document included in said received message to a check target document and executing a predetermined hash total process to said check target document to form a check hash total;

(b) sequentially selecting the at least one digital signature as a check target from among the digital signatures included in said received message in accordance with the order from a most recent digital signature and deciphering said check target digital signature by using a decipher key corresponding to the signatory of the at least one digital signature to generate check signature data including a deciphered signature hash total;

(c) checking whether the deciphered signature hash total coincides with the check hash total; and (d) when said deciphered signature data includes the version management information, restoring the former version electronic document from the version management information and the check target document, setting the former electronic document and a next digital signature into a new check target document and a new check target digital signature, respectively, and repeating said steps (a) to (c), and when the deciphered signature data do not include the version management information, setting the next digital signature into a check target digital signature, and repeating said steps (b) and (c).

11. A method according to claim 10, wherein a public key corresponding to the signatory in a public-key cryptosystem is used in the decipher process of the signature data executed in said step (b).

12. A method according to claim 10, wherein the restore process of the electronic document of the former version executed in step (d) is performed by deleting the document information in the partial region which is specified by said version management information from the check target document.

13. A method of authenticating an electronic document, wherein a message is received, which message includes a current version electronic document, a plurality of digital signatures added to said electronic document in a designated order, and version management information which defines how to restore from the current version electronic document each of at least one former version electronic document, and at least one of said plurality of digital signatures having been obtained by enciphering signature data including personal information of a signatory, a first hash total obtained by performing a hash total process to a one of the former version electronic documents to which said digital signature was initially added, and a second hash total obtained by executing a hash total process to the version management information which defines how to restore the current version electronic document to said one of the former version electronic documents, the method comprising the steps of:

(a) setting the current electronic document to a check target document and performing a predetermined hash total process to said check target document to form a check target hash total;

(b) sequentially selecting each digital signature from among the plurality of digital signatures included in said received message in accordance with the designated order and deciphering the signature data from the check target digital signature by using a decipher key corresponding to the signatory of the each digital signature as its check target;

(c) checking whether the first hash total extracted from said deciphered signature data coincides with the check target hash total;

(d) when the deciphered signature data includes the second hash total, sequentially selecting the version management information included in the received message as a check target management information in accordance with the designated order from the latest version management information, performing a predetermined hash total process to the check target management information, and checking whether the has total obtained by performing a predetermined has process to the check target management information coincides with the second hash total or not; and (e) when the deciphered signature data includes the second hash total, restoring one of the former version electronic documents from the version management information as said check target and the check target document, setting the electronic document of the former version and the next digital signature into a new check target document and a new check target digital signature, respectively, and repeating said steps (a) to (d), and when the deciphered signature data does not include the version management information, setting a next digital signature into a check target digital signature, and repeating the steps (b) to (d).

14. A method according to claim 1, wherein a public key corresponding to the signatory in a public-key cryptosystem is used in the decipher process of the signature data executed in said step (b).

15. A processing system of an electronic document connected to a network, comprising:

means for receiving a communication message including at least one prior digital signature and a former version electronic document from said network;

checking means for checking the relation between the former version electronic document received from the network and the digital signature added thereto;

means for changing a part of the former version electronic document in accordance with an inputting operation from a user to form a new version electronic document;

means for forming a new digital signature having a predetermined relation with the new version electronic document;

means for transmitting a communication message including the new version electronic document, the prior digital signature, and the new digital signature to the network, said new digital signature forming means including: a means for performing an encipher process to signature data by a secret key of the user, in which said signature data comprises a document hash total received from a hash total means which executes a hash total process to the new version electronic document, personal information of the user, and version management information which defines how to restore the former version electronic document from the new version electronic document.

16. A system according to claim 15, wherein said checking means comprises:

first means for setting the electronic document included in said received message to a check target document and performing a predetermined hash total process to said check target document, thereby forming a hash total of document data;

second means for deciphering the signature data from the digital signature which was sequentially selected as a check target from among the digital signatures included in said received message in accordance with the order from the latest digital signature by using a decipher key corresponding to said selected digital signature;

third means for checking whether or not the document hash total extracted from said deciphered signature data coincides with the document hash total formed from the check target document;

fourth means for restoring the electronic document of a further former version on the basis of the version management information and the check target document in the case where said deciphered signature data includes the version management information; and fifth means for making said first to fourth means operative by setting the electronic document of the further former version into new check target document.

17. A processing system of an electronic document connected to a network, comprising:

means for receiving a communication message which is constructed by (1) a former version electronic document and (2) document annexed information including at least one prior digital signature from the network;

check means for checking a relation between the former version electronic document received from the network and the prior digital signature;

means for changing the former version electronic document in accordance with an inputting operation by user to a new version electronic document;

means for forming a new digital signature having a predetermined relation with the new version electronic document, in which the digital signature is formed by performing an encipher process on signature data from a secret key of a new signatory, said signature data comprising a first hash total obtained by executing a hash total process to the new version electronic document, personal information of the user, and a second hash total obtained by executing a hash process to version management information which defines how to restore the former version electronic document from the new version electronic document; and means for transmitting a communication message including the new version electronic document, the document annexed information, the new digital signature, and the version management information to said network.

18. A system according to claim 17, wherein said checking means comprises:

first means for setting the electronic document included in the received message into a check target document and performing a predetermined hash total process to said check target document, thereby forming a document hash total;

second means for deciphering the signature data form the digital signature which was sequentially selected as a check target from among the digital signatures included in the received message in accordance with the order from the latest digital signature by using a decipher key corresponding to said selected digital signature;

third means for checking whether the first hash total extracted from said deciphered signature data coincides with the document hash total formed from said check target document or not;

fourth means for sequentially selecting the version management information as a check target from the version management information included in the received message in accordance with the order from the latest version management information in the case where said deciphered signature data includes the second hash total and forming a management information hash total obtained by executing a predetermined hash total process to the version management information as said check target;

fifth means for checking whether said management information hast total coincides with the second hash total extracted from said decrypted signature data or not;

sixth means for restoring the electronic document of a further former version on the basis of the version management information as said check target and the check target document in the case where said deciphered signature data includes the second hash total; and seventh means for setting the electronic document of the further former version into a new check target document and for making said first to sixth means operative.

* * * * *

UNITED STATES PATENT AND TRADEMARK OFFICE
CERTIFICATE OF CORRECTION

PATENT NO. : 5,465,299
DATED : November 7, 1995
INVENTOR(S) : Hiroshi Matsumoto, et al.

It is certified that error appears in the above-indentified patent and that said Letters Patent is hereby corrected as shown below:

Claim 1, column 13, lines 2-3, delete "of a former version".

Claim 14, column 15, line 65, delete "1" and insert therefor --10--.

Signed and Sealed this

Sixteenth Day of January, 1996

*Attest:*

BRUCE LEHMAN

*Attesting Officer*   *Commissioner of Patents and Trademarks*